(12) United States Patent
Stecher

(10) Patent No.: US 7,779,214 B2
(45) Date of Patent: Aug. 17, 2010

(54) PROCESSING SYSTEM HAVING A SUPPORTED PAGE SIZE INFORMATION REGISTER

(75) Inventor: Brian Stecher, Kanata (CA)

(73) Assignee: QNX Software Systems GmbH & Co. KG, Hannover (DE)

( * ) Notice: Subject to any disclaimer, the term of this patent is extended or adjusted under 35 U.S.C. 154(b) by 520 days.

(21) Appl. No.: 11/779,853

(22) Filed: Jul. 18, 2007

(65) Prior Publication Data

US 2009/0024824 A1     Jan. 22, 2009

(51) Int. Cl.
    *G06F 12/06*     (2006.01)
(52) U.S. Cl. ...................... 711/156; 711/203
(58) Field of Classification Search .......... 711/203, 711/207, 156, 170
    See application file for complete search history.

(56) References Cited

U.S. PATENT DOCUMENTS 5,752,275 A * 5/1998 Hammond .................. 711/207
5,918,250 A * 6/1999 Hammond .................. 711/205
6,378,059 B1   4/2002 Miyoshi
2002/0169936 A1  11/2002 Murphy
2004/0215918 A1  10/2004 Jacobs et al.
2008/0104362 A1 * 5/2008 Buros et al. ................. 711/207

FOREIGN PATENT DOCUMENTS

WO    WO 2006/106428 A2    10/2006

* cited by examiner

*Primary Examiner*—Pierre-Michel Bataille
(74) *Attorney, Agent, or Firm*—Brinks Hofer Gilson & Lione

(57) ABSTRACT

A processing system includes initialization software that is executable by a processor to identify one or more memory page sizes supported by the processing system. The supported memory page sizes that are identified by the initialization software are stored in one or more memory page size identification registers. Individual bits of the one or more memory page size identification registers may be respectively associated with a memory page size. Whether a memory page size is supported by the processing system may be determined by checking the logic state of the individual bit corresponding to the memory page size.

16 Claims, 9 Drawing Sheets

PROCESSING SYSTEM HAVING A SUPPORTED PAGE SIZE INFORMATION REGISTER

BACKGROUND OF THE INVENTION

1. Technical Field

The present invention relates to memory management in a processing system and, more particularly, to a processing system having a supported page size information register.

2. Related Art

There are different manners in which the memory of a processing system may be organized. One such system uses virtual memory. Virtual memory allows software to run in a memory address space in which the size and addressing of the memory space is not tied strictly to the physical memory of the processing system. In virtual memory systems, the operating system maps virtual memory to physical memory. The operating system uses this mapping to detect when an address is required that does not currently relate to main memory so that the requested data can be accessed.

Virtual memory may be implemented through paging. When the processing system uses paging, the low order bits of the virtual address are preserved and used directly as the low order bits of the actual physical address. In contrast, the high order bits may be treated as a key or index to one or more address translation tables that correspond to a range of consecutive physical addresses. The memory referenced by such a range may be called a page. Page sizes may range in size, for example, from 512 bytes through 8 megabytes.

The mappings between virtual memory and physical memory may be stored in page table entries of a page table array. These page table entries may be used by the operating system to translate the virtual address to a physical address. The processing system may include a translation lookaside buffer (TLB) to enhance the efficiency with which virtual memory addresses are translated to the corresponding physical addresses. The TLB may be a memory that has a fixed number of entries containing parts of various page table entries that improve the speed of the translation of a virtual address to its corresponding physical address. A TLB may include a content-addressable memory in which the search key is the virtual address and the search result is the physical address and access permissions. If the search of the TLB yields a match, the translation is known very quickly, and the physical address is used to access memory. If the virtual address is not in the TLB, the translation proceeds via the page table, which may take longer to complete.

The page size of the virtual/physical address space may be fixed and/or difficult to dynamically change. Nevertheless, the page size(s) used in the page table entries and the TLB entries may have an impact on the performance of the system memory. Smaller page sizes may be advantageous when high granularity control of the memory access permissions is required. Likewise, small page sizes may be advantageous when applications only require small portions of the virtual memory space for their operation. Large page sizes, however, may be advantageous when used in connection with a TLB since TLB misses are less likely to occur when the virtual memory space is organized into large pages.

Many systems that use multiple page sizes do so in a static manner. The versatility of such systems may be limited. Other systems implement multiple page sizes in a dynamic manner using hardware. Multiple TLBs also may be used with different characteristics associated with each page size. However, the manner in which the multiple page sizes may be realized is restricted to the manner in which it is implemented in the hardware and may add a significant amount of cost to the system.

Different chip implementations, even within the same CPU architectures, may have differing methods of reporting their page size support capabilities. Of the will page size support may be provided in code that is specific to the CPU architecture. This may require writing new kernel code for each CPU configuration, which can be costly and time-consuming. Therefore, a need exists for an improved system that can isolate supported page sizes from the kernel while concurrently supporting variable page sizes.

SUMMARY

A processing system includes initialization software that is executable by a processor to identify one or more memory page sizes supported by the processing system. The supported memory page sizes that are identified by the initialization software are stored in one or more memory page size identification registers. Individual bits of the one or more memory page size identification registers may be respectively associated with a memory page size. Whether a memory page size is supported by the processing system may be determined by checking the logic state of the individual bit corresponding to the memory page size.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
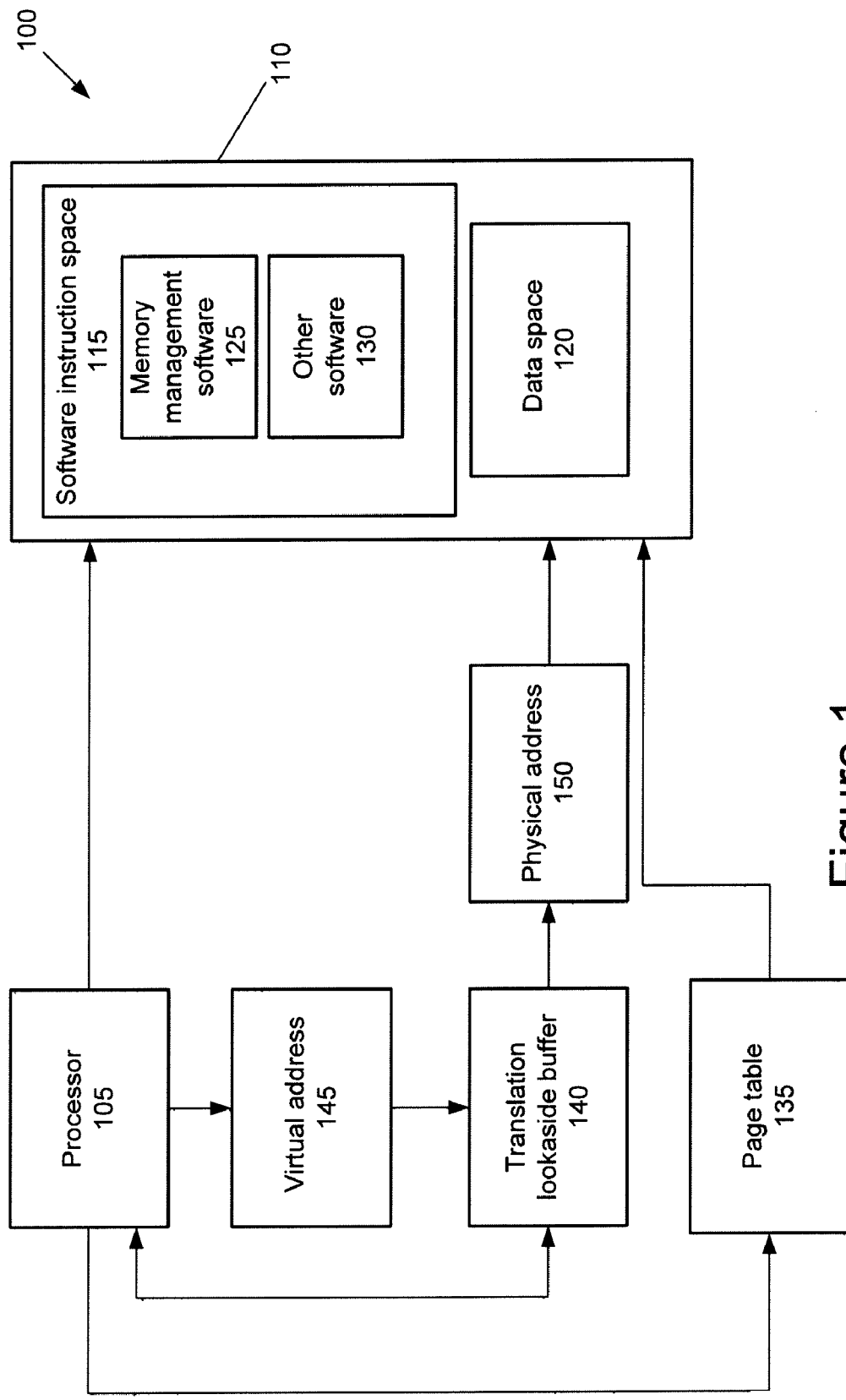
FIG. 1 is a block diagram of an exemplary processing system.

FIG. 1 is a block diagram of a processing system 100 that may implement variable page size memory organization. The processing system 100 includes a processor 105 that accesses physical memory 110. Processor 105 is shown as a single processor. However, system 100 may be implemented as a multiprocessor system, a parallel processing system, or other architectures.

Physical memory 110 may include software instruction space 115 and data space 120. The software instruction space 115 may include memory management software 125 and other software code 130. The memory management software 125 may be executable by processor 105 to manage the memory space of the processing system 100. In FIG. 1, the memory management software 125 manages the memory of system 100 using virtual memory addressing or methods that address memory separate from the main memory.

In FIG. 1, the processing system 100 uses one or more page tables 135 that provides a mapping between virtual memory addresses and corresponding physical addresses of physical memory space 110. Multiple page tables may be used and managed. Page table 135 may reside in the physical memory space 110, in a memory management unit, and/or in other physical memory space.

A translation lookaside buffer (TLB) 140 is adapted to cache certain entries of the page table 135. The cache provides faster translations between a virtual address provided by processor 105 at 145 and a physical address provided at 150. The physical address 150, in turn, is used to access the corresponding entries of physical memory space 110. The TLB 140 may be part of the processor 105, part of a memory management unit, or maybe part of a separate hardware module.

Memory page size support may vary between processing architectures, even within the same processor family. The software used to identify the supported memory page sizes may be directly linked into the kernel of the operating system. The processing system 100, however, isolates the supported memory page sizes from the kernel so that the supported sizes may be identified and accessed during initialization and/or reset operations without further reference to the kernel.

Figure 2:
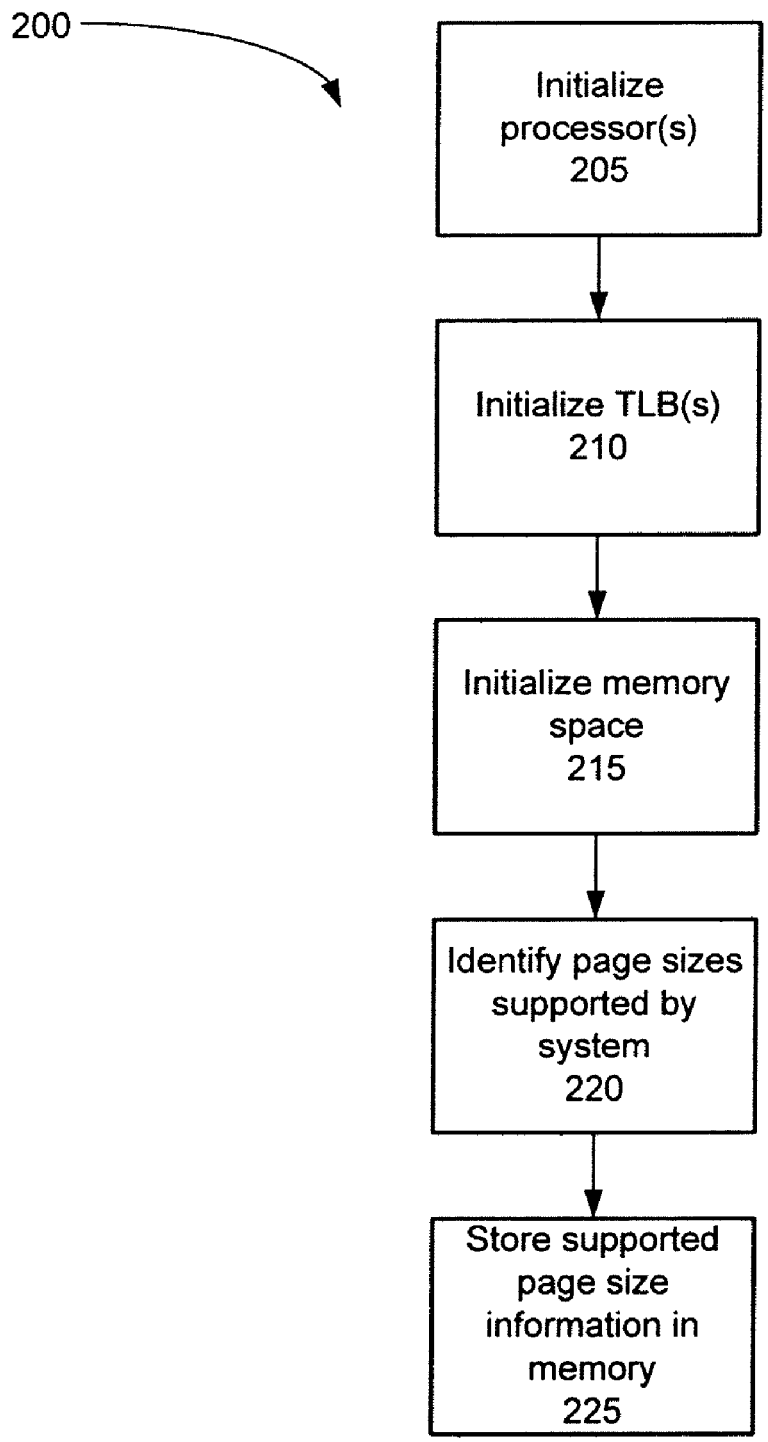
FIG. 2 is a diagram of one system initialization operations.

FIG. 2 shows initialization software 200 that may be executed by the processing system 100 during a system initialization/reset operation. At 205, the processor(s) is reset/initialized. The entries of the TLB 140 are initialized at 210. At 215, the memory space used in the processing system 100 is initialized. Any inquiries relating to the memory page sizes supported by the processing system 100 are made at 220. The software that controls these inquiries may be made initially through the kernel of the operating system and may be generic to multiple processor architectures. However, the software need not be directly linked into the kernel and, therefore, may easily be varied from system to system. Information identifying the supported memory page sizes may be stored in a canonical format in memory at 225. The supported memory page sizes may subsequently be accessed through reference to the stored information.

Figure 3:
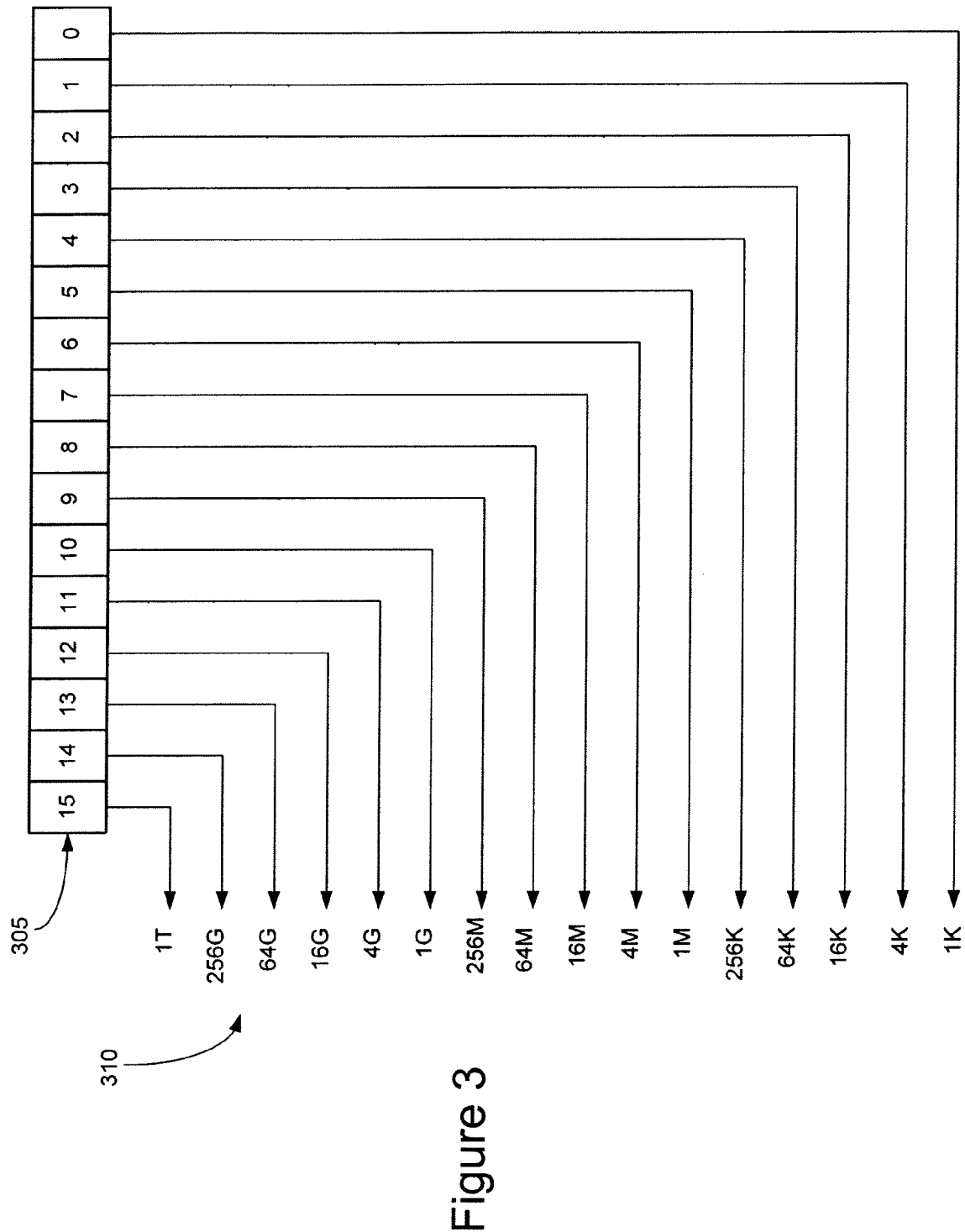
FIG. 3 shows a structure that may be used for the supported memory page size identification register.

FIG. 3 shows a register format that may be used to store the memory page size information identified at 225. The memory page size identification register 305 of FIG. 3 is comprised of 16 bits. Each of these bits is in a predetermined logic state, such as a true or false state, depending on whether the memory page size corresponding to that location is supported or unsupported. The correlation between the 16 bits of register 305 and their memory page size is designated by the lines connecting a given bit to an alphanumeric character corresponding to the memory page size. If a bit in register 305 is set to a true logic state, the memory page size corresponding to that bit is supported by the processing system 100. For example, if the memory page size identification register 305 stored a word having a value 0X17H, it would indicate that the supported page sizes are 1 kilobyte, 4 kilobytes, 16 kilobytes, and 256 kilobytes. Any time a software process is in need of the supported page size information, it can access the information stored in the register 305.

Figure 4:
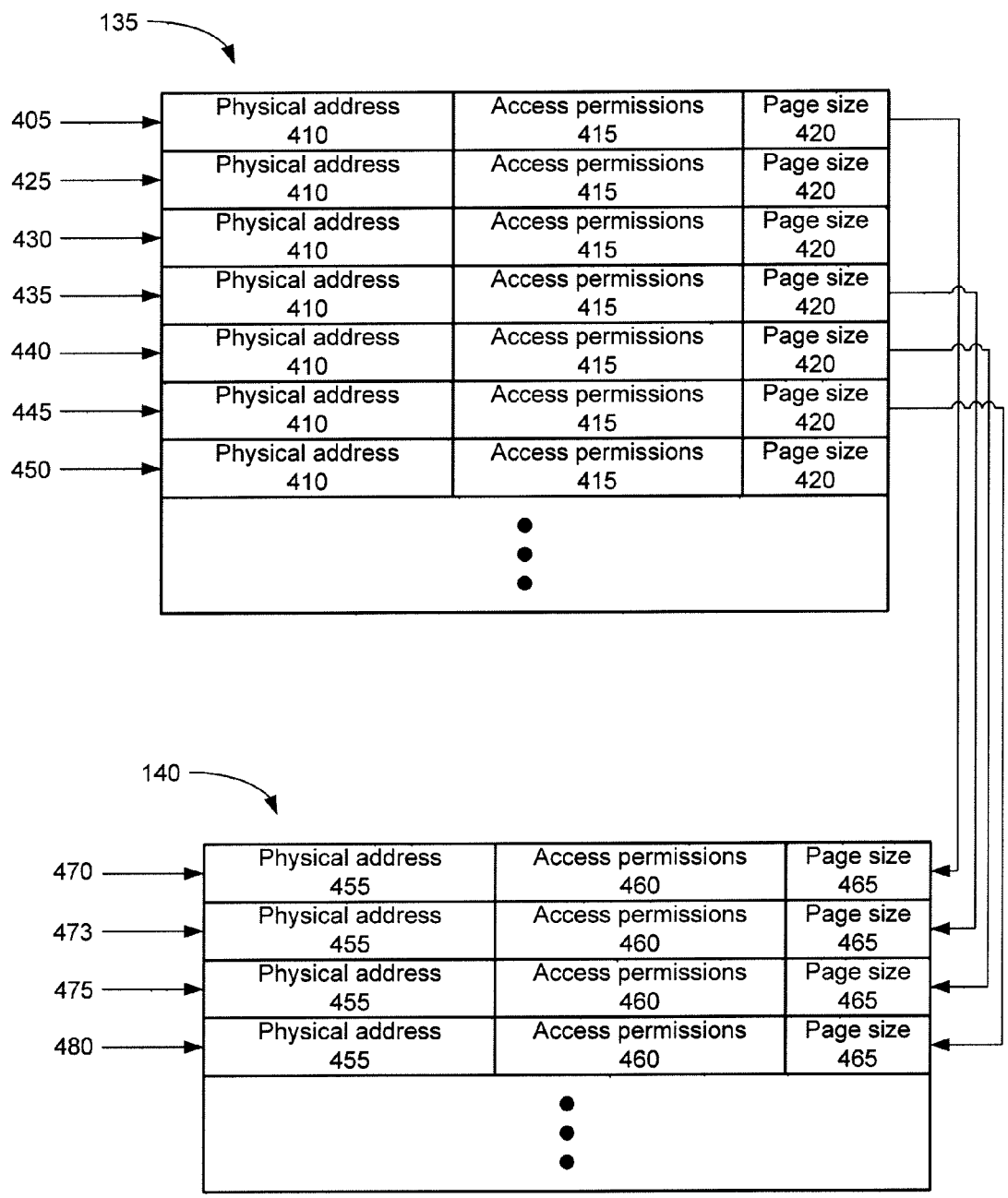
FIG. 4 illustrates page table and TLB structures that may be used in the processing system shown in FIG. 1.

FIG. 4 illustrates a structure for the page table 135 and TLB 140. In these tables, the low order bits of the binary representation of a virtual address are preserved and may be used as the low order bits of the physical address. The high order bits may be treated as a key into one or more page tables. The page tables, in turn, include virtual address to physical address translation information. The page table 135 may include a plurality of page table entries 405, 425-450. Each of the illustrated page table entries 405, 425-450 may include information for translating a virtual address to a corresponding physical address 410. Entries may also include memory page size information 420 identifying the page size of the corresponding virtual address page and access permission information 415 for the corresponding virtual address page. Other information about the virtual address page such as whether the page has been written to by a process, when it was last used, also may be included in each of the page table entries.

The translation lookaside buffer 140 is used to cache selected entries of the page table 135. Each of the TLB entries, such as those shown at 470, 473, 475, and 480 may include a subset, additional information, or the same information as that found in the page table entries of page table 135. In FIG. 4, each of the TLB entries may include information for translating a virtual address to a corresponding physical address 455 and memory page size information 465 for a identifying the page size of the corresponding virtual address page. It may also include access permission information 460 identifying the access permissions for the corresponding virtual address page. As with the page table entries, other information relating to the address page such as whether the page has been written to by a process and/or, when it was last used also may be included in each of the TLB entries.

The TLB 140 may have a limited number of TLB entries. The number of entries may be less than the number of page table entries in page table 135. The selection of the page table entries that are to be cached in the TLB 140 may be determined by one or more caching processes. Such processes may rely on the relative locality of requested/accessed virtual memory locations, the frequency with which the virtual memory locations are accessed by various software applications, and/or other criteria. One or more such processes may be employed based on detailed system requirements, which may vary from system to system. To facilitate explanation, page table entry 405 is cached at TLB entry 470, page table entry 435 is cached at TLB entry 473, page table entry 440 is cached at TLB entry 475, and page table entry 445 is cached at TLB entry 480.

Figure 5:
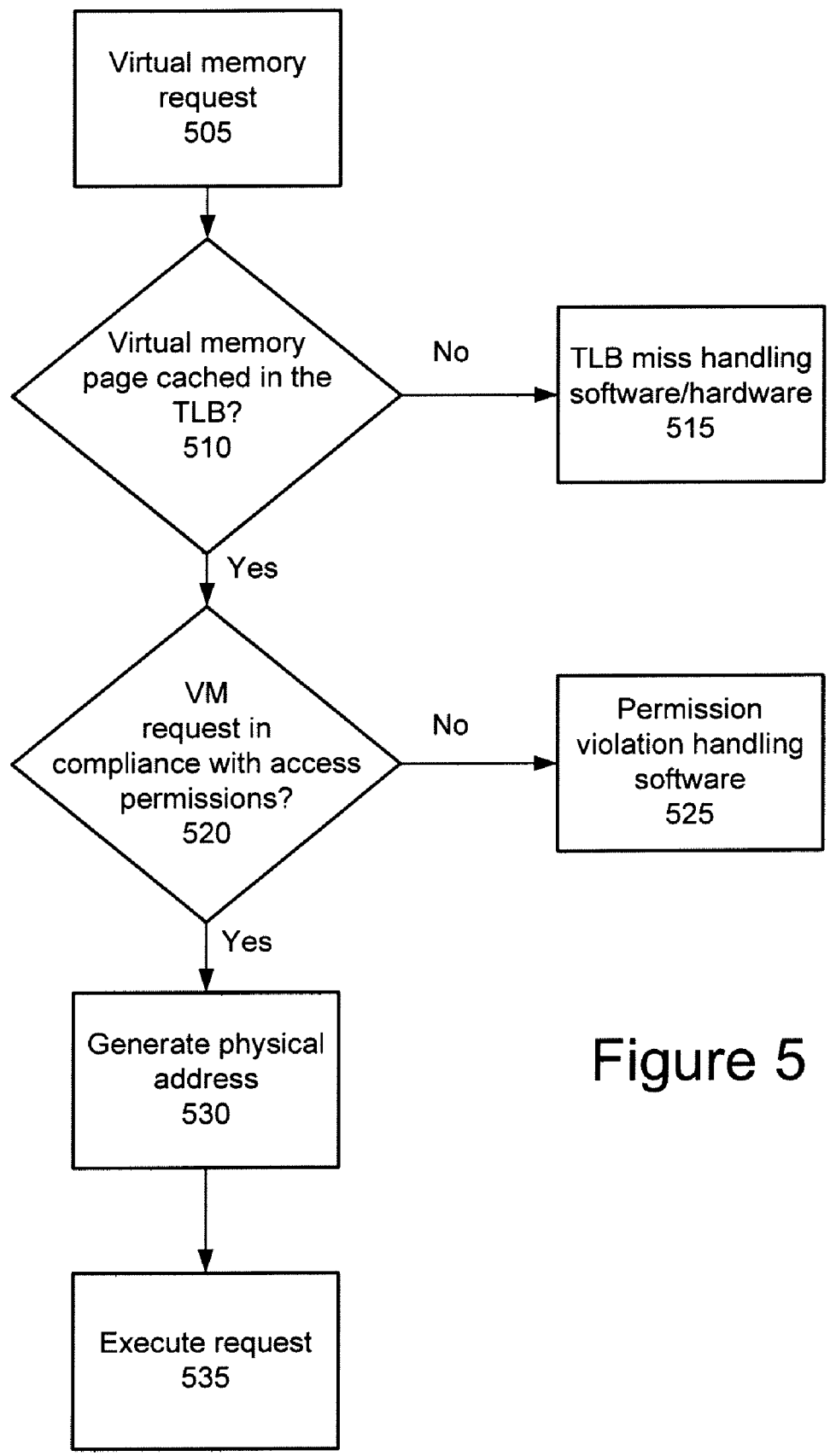
FIG. 5 shows operations that process a request associated with virtual memory.

FIG. 5 is a diagram showing operations that may be used to process a request associated with virtual memory. A virtual memory request is executed at 505. At 510, the process determines whether the virtual memory page associated with the virtual memory request is cached in the TLB 140. If it is not, the smay execute one or more operations associated with TLB miss handling hardware/software at 515. However, if the virtual memory page associated with the virtual memory request is cached in the TLB 140, the process determines whether the request complies with the access permissions associated with the virtual memory page. The process may check the access permissions 460 of the corresponding TLB entry to make sure that the request does not violate the permissions for the virtual memory page. Such permissions may identify the corresponding virtual memory page as read-only, write-only, read/write, or another state. If the virtual memory request at 505 is invalid as determined by the check at 520, the process may execute one or more operations associated with permission violation handling software 525. Otherwise, the TLB 140 uses the upper bits of the virtual memory to generate the upper portion of a physical address page, while the lower bits of the virtual memory address may be used as an offset into the physical address page. These operations may be executed at 530. Execution of the virtual memory request using the corresponding physical address is executed at 535.

Figure 6:
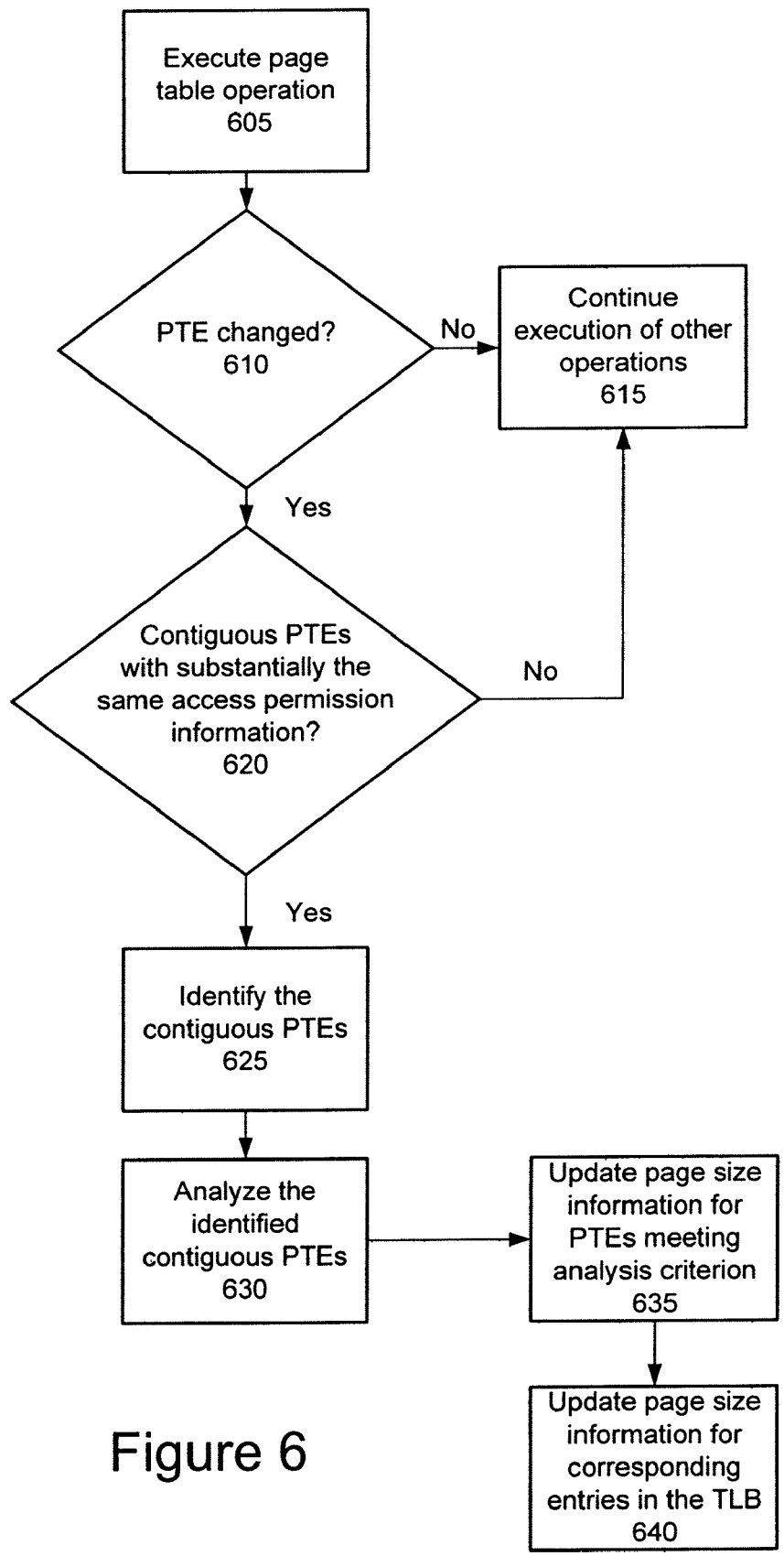
FIG. 6 shows operations that implement variable page size memory organization.

FIG. 6 shows operations that may be executed to implement variable page size memory organization. At 605, a page table operation is executed. This operation may include any operation that alters the page table 135 such as, for example, accessing page table entries, adding page table entries, removing page table entries, updating page table entries, or other operations. At 610, the process checks the page table 135 to determine whether the operation executed at 605 has changed a page table entry. Such changes may include whether a new page table entry has been added, whether an existing page table entry has been removed, or other operations. If the operation executed at 605 has not resulted in such a change to one or more of the page table entries, the processing system 100 continues with the execution of other operations at 615.

If the operation executed at 605 has resulted in a change to the page table entries of the page table 135, a further check is made at 620. In this check, the processing system 100 determines whether the changes have resulted in a run of contiguous page table entries having common characteristics. Contiguous page table entries may be those that have both contiguous virtual addresses and contiguous physical addresses. At 620, the check involves locating contiguous page table entries having substantially the same or identical access permission information. To increase the efficiency of this check, the operations at 620 may be limited to a check of page table entries within a certain locational distance of the changed page table entry. If no such contiguous page table entries are found during the check at 620, the processing system 100 may continue execution of other operations at 615.

If a run of contiguous page table entries having the requisite common characteristics are found, the contiguous page table entries are identified at 625 and analyzed at 630. The analysis at 630 may include, for example, an analysis of whether any run of the contiguous page table entries may be consolidated into one or more page table entries having a larger page size than the page size of the original contiguous page table entries. The new, larger page size may be a multiple of the smallest page size used to organize the virtual memory space of the processing system 100. For example, if there are at least sixteen contiguous page table entries identified at 625 that have a page size of 4 kilobytes each, the page size for the contiguous page table entries may be updated to a larger virtual page size of 64 kilobytes. Similarly, if there are 256 contiguous page table entries identified at 625 that have a page size of 4 kilobytes each, the page size for the contiguous page table entries may be updated to a larger virtual page size of 1 megabyte.

Contiguous page table entries meeting the analysis criterion applied at 630 are updated at 635 with the new page size information. The updating operation applied at 635 may involve replacing each of the contiguous page table entries with the same information, including the new page size information. Alternatively, if permitted by the architecture of the page table, it may be possible to consolidate the contiguous page table entries into a single page table entry having the new page size information thereby releasing the memory associated with the remaining contiguous page table entries.

Entries in the TLB 140 corresponding to the page table entries updated at 635 are updated at 640 with the new page size information. The updating operation applied at 640 may involve consolidating all of the TLB entries corresponding to any of the consolidated contiguous page table entries into a single TLB entry with new information, including the new page size information. The remaining TLB entries corresponding to the consolidated contiguous page table entries may be removed from the TLB 140 thereby freeing TLB memory and allowing the TLB 140 to cache more page table entries.

The number of contiguous page table entries identified at 620 of FIG. 6 that are consolidated to entries having a larger page size may vary. For example, it may be possible to consolidate all of the contiguous page table entries identified at 620. Alternatively, it may be possible to consolidate one or more subsets of the identified contiguous page table entries to corresponding page table entries of the same or different page sizes. Which of the contiguous page table entries identified at 620 are ultimately consolidated, if any, may depend on system design specifications and the specific analysis requirements applied to the identified entries at 630.

Figure 7:
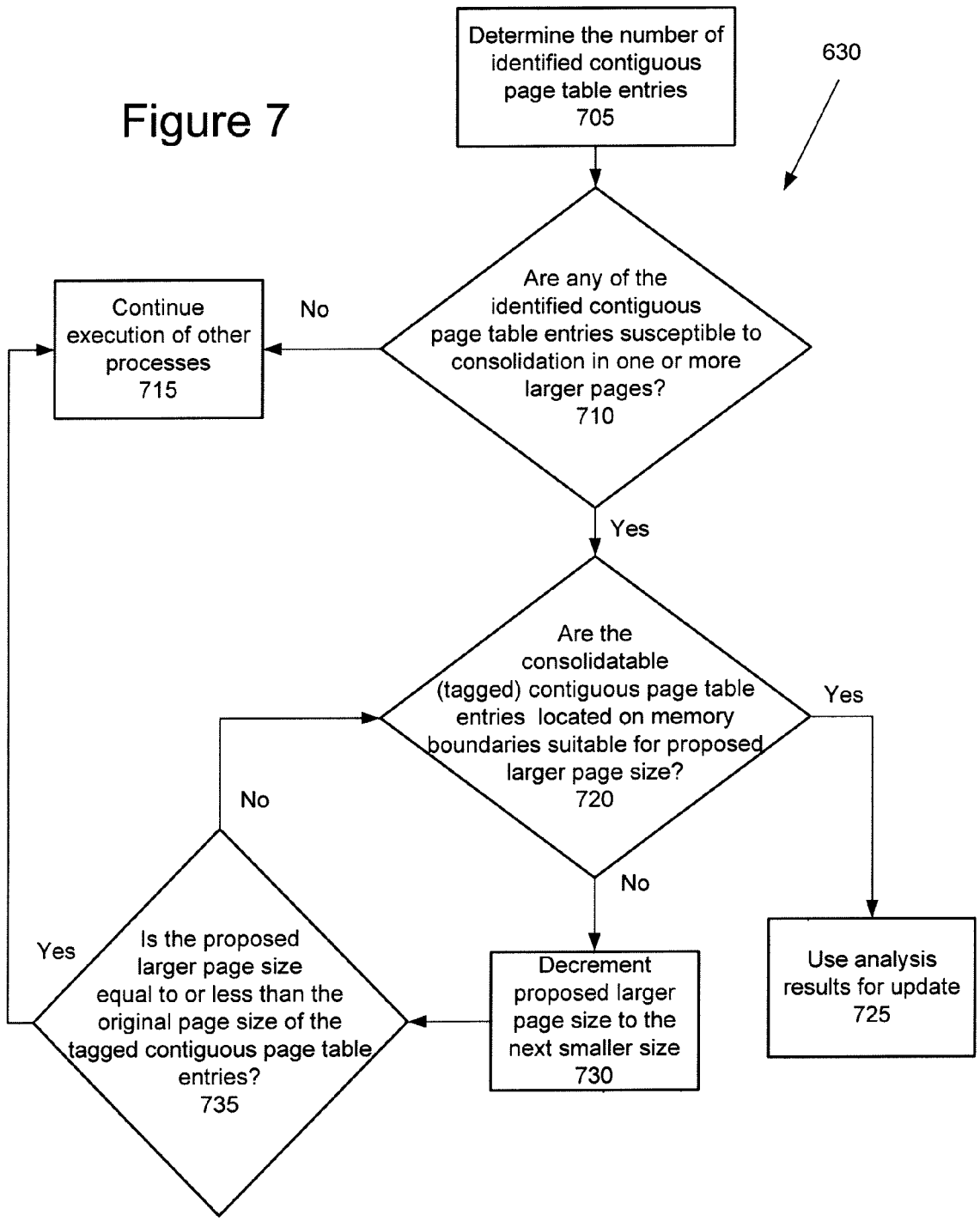
FIG. 7 shows operations that may be executed by the processing system during the analysis operation of FIG. 6.

FIG. 7 is a diagram showing operations that may be executed by the processing system 100 during the analysis operation shown at 630 of FIG. 6. In FIG. 7, the operations are executed to determine whether any of the identified contiguous page table entries of 625 meet the criterion for consolidating them into one or more page table entries having a larger page size. The number of identified contiguous page table entries are determined at 705. At 710, a check is made to determine whether there are a sufficient number of contiguous page table entries in the identified range to consolidate into one or more page table entries having a larger page size. The number of contiguous page table entries that should exist in the decision operation at 710 before they are consolidated to a page table entry having a larger page size may vary from system to system. In the illustrated example, a decision on whether to consolidate the contiguous page table entries to a page table entry having a larger virtual page size may be based on whether the number of original contiguous page table entries are sufficient to form a page table entry having a new virtual page size that is supported by the system 100. The page sizes supported in the processing system 100 may be querying the information found in register 305 of FIG. 3.

At operation 710, the process may consider whether the consolidation will result in wasted memory space. If the consolidation will result in an excess amount of memory space toward the end of a consolidated virtual page, a decision may be made at 710 to prevent consolidation or to consolidate the page table entries to a new supported page size. The new page size may be larger than the page size of the original contiguous page table entries but smaller than the largest page size value that could otherwise be used to consolidate the contiguous page table entries.

As a result of the operation shown at 710, an initial decision may be made on whether a consolidation will take place, which of the identified contiguous page table entries are susceptible of consolidation, and the proposed page size that will be used for the consolidation. If a decision is made at 710 to forgo consolidation of any of the identified contiguous page table entries, then the processing system 100 may continue execution of other processes at 715. However, if a decision is made at 710 to consolidate any run of contiguous page table entries, a further analysis occurs at 720. The analysis at 720 determines whether the run of contiguous page table entries are located on page table boundaries suitable for use with the proposed larger page size value. For example, if a set of 4 kilobytes/page contiguous page table entries are to be consolidated to a page table entry having a page size of 64 kilobytes, the first page table entry of the set of contiguous page table entries should begin at a 64 kilobyte boundary of the memory space 110.

If the contiguous page table entries meet the memory boundary criterion of 720, then the contiguous page table entries that are to be consolidated and the proposed page size are passed to 635 of FIG. 6 at 725. Otherwise, the proposed page size may be decreased to the next smaller page size supported by the process at 730. At 735, the process determines whether the decreased page size is equal to or less than the original page size of the contiguous page table entries. If the smaller page size is equal to or less than the original page size, then there is no need to consolidate the contiguous page table entries and the processing system 100 may continue execution of other processes at 715. However, if the decreased page size is greater than the original page size, the memory boundary check at 720 may be executed using the smaller page size. These operations may be repeated until the memory boundary check is met or the proposed page size is decreased so that it is equal to or less than the original page size of the contiguous page table entries that are tagged for consolidation.

Figure 8:
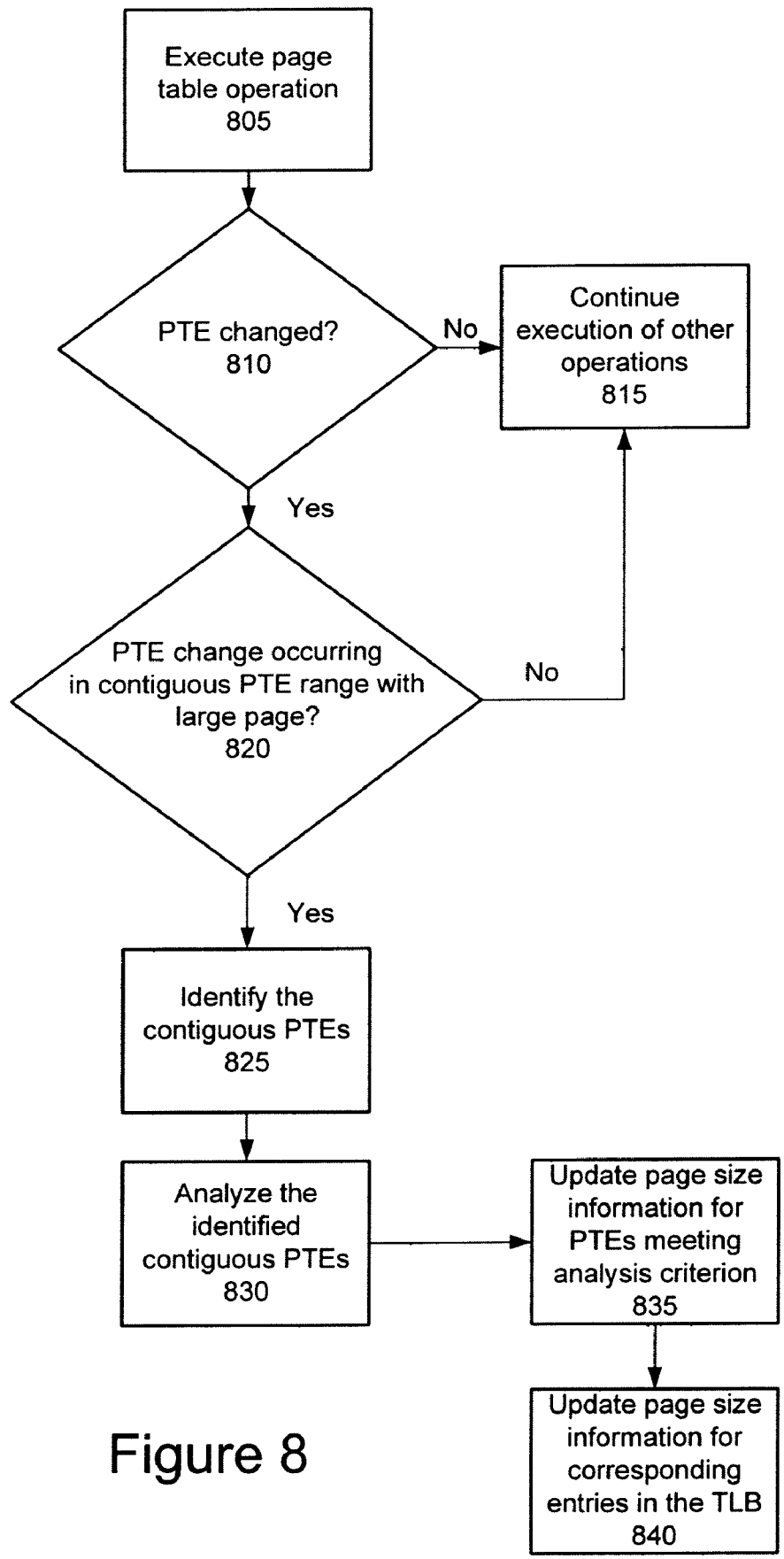
FIG. 8 shows operations for reducing the page size of contiguous page table entries.

FIG. 8 shows a process that may be used to reduce the page size of contiguous page table entries when necessary. At 805 a page table operation is executed. This operation may include any operation that alters the page table 135 such as, for example, accessing page table entries, adding page table entries, removing page table entries, updating page table entries, or other operations. At 810, the processing system 100 determines whether the operation executed at 805 has changed a page table entry. Such changes may include whether an existing page table entry has been removed or similar operation. If the operation at 805 has not resulted in such a change to one or more of the page table entries, the processing system 100 continues with the execution of other operations at 815.

If the entries of the page table change at 805, a further check is made at 820. At 820, the processing system 100 checks the changed page table to determine whether the changes have occurred in a contiguous page table entry range with large pages. At 820, the check may involve determining whether the changed page table entry is in a range of page table entries that were previously consolidated into a page table entry having a large page size. If no such contiguous page table entries are found during the check at 820, the processing system 100 may continue execution of other operations at 815.

If such contiguous page table entries are found at 820, the contiguous page table entries are identified at 825 and analyzed at 830. The analysis at 830 may include an analysis of whether the contiguous page table entries may be divided into multiple page table entries having a reduced page size when compared to the original page size of the contiguous page table entries. The new, reduced page size may be a multiple of the smallest page size used to organize the virtual memory space of the processing system 100, and which is supported by the system 100 as indicated by register 305.

Contiguous page table entries meeting the analysis criterion applied at 830 are updated at 835 with the new page size information. The updating operation applied at 835 may replace each of the contiguous page table entries with the same information, including the new page size information and/or dividing a previously consolidated page table entry range into multiple ranges having a smaller page size.

Entries in the TLB 140 corresponding to the page table entries updated at 835 are updated at 840 with the new page size information. The updating operation applied at 840 may involve adding further TLB entries corresponding to the contiguous page table entries analyzed at 830.

Figure 9:
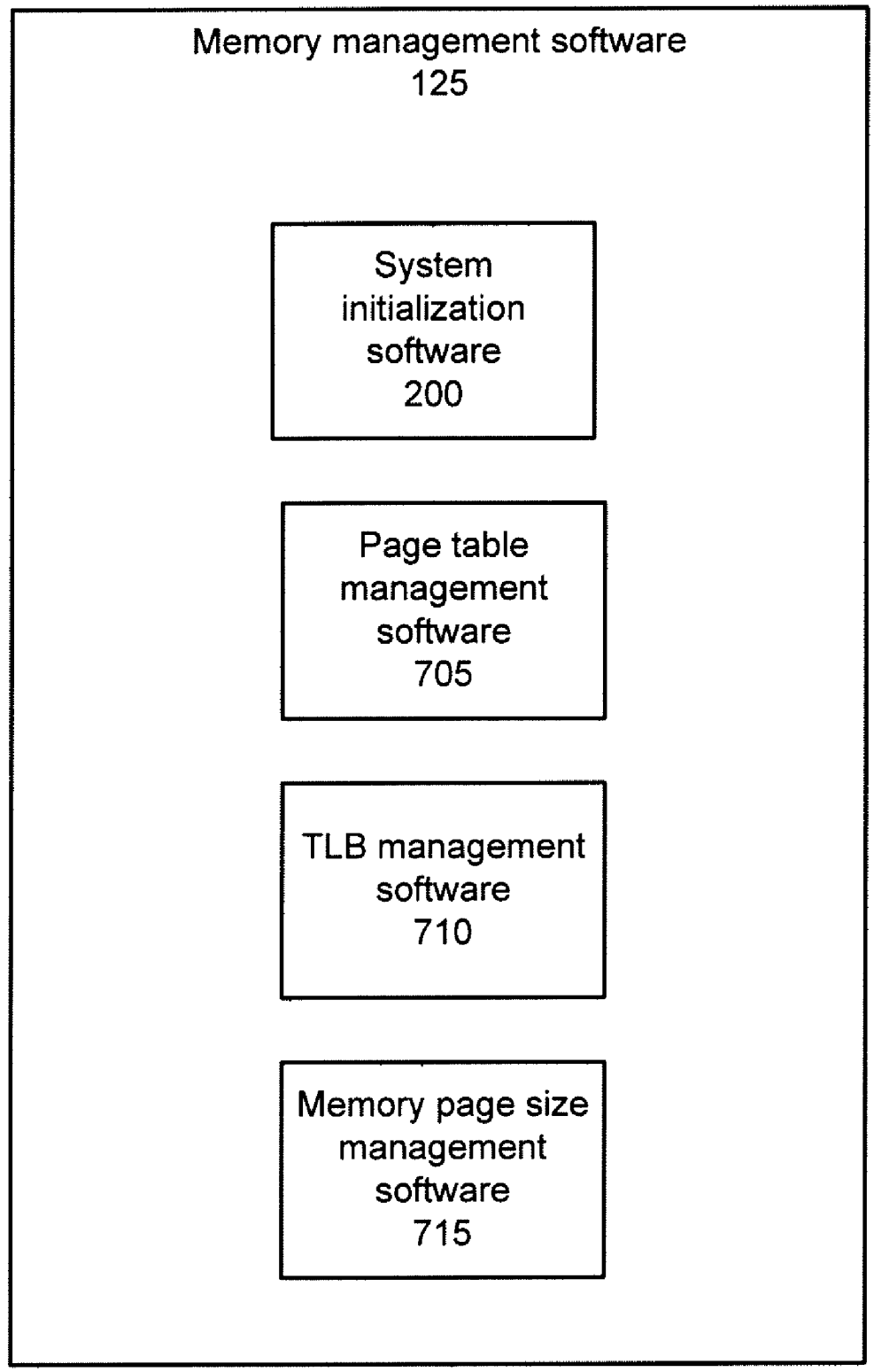
FIG. 9 is a block diagram of the memory management software of and will FIG. 1.

FIG. 9 shows a manner of implementing the memory management software 125 architecture. The memory management software 125 may include portions of the system reset/initialization software 200, page table management software 705, TLB management software 710, and memory page size management software 715. The memory management software 125 and the system reset/initialization software may support memory page sizes of the system in a canonical format such as the format shown in FIG. 3. The supported page size information is subsequently available to the page table management software 705, the TLB management software 710, and the memory page size management software 715 without resort to kernel specific code or calls. The page table management software may manage a page table, such as page table 135, having a plurality of page table entries. Each of the plurality of page table entries may include information for translating a virtual address to a corresponding physical address, memory page size information for a corresponding virtual address page, and access permission information for the corresponding virtual address page. The translation lookaside buffer management software may manage a translation lookaside buffer that is adapted to cache information corresponding to a plurality of the page table entries, including corresponding memory page size information. The translation lookaside buffer management software may manage multiple translation lookaside buffers.

The memory page size management software may be responsive to changes in the page table made by the page table management software to identify contiguous page table entries having substantially same access permission information. The memory page size management software may update the memory page size information for at least one of the identified contiguous page table entries with new memory page size information if an analysis of the identified contiguous page table entries warrants a change to the memory page size. The new memory page size information may correspond to a largest supported memory page size to which any run of the identified contiguous page table entries may be mapped. The new memory page size may correspond to a larger page size than originally assigned to the identified contiguous page table entries. Alternatively, the new memory page size information may correspond to a reduced supported memory page size of a previously consolidated range of contiguous page table entries. The memory page size management software also may facilitate updating one or more corresponding entries, if any, of the translation lookaside buffer with the new memory page size information.

The memory page size management software may limit its analysis operations to a predefined range of page table entries to increase efficiency. Analysis may be limited to contiguous page table entries that are locally proximate page table entries that have been changed in the page table, deleted from the page table, and/or added to the page table. The change, deletion, and/or addition may correspond to the change in the page table to which the memory page size management software has responded to make the check. Further, the memory page size management software may be responsive to changes in the page table to facilitate updating the memory page size information for all of the contiguous page table entries with the new memory page size information.

The specific functionality of each of the components of the memory management software 125 set forth above may be shared between them. There need not be any strict divisions of that functionality. In one system, the memory page size management software 715 may directly update the corresponding entries of the translation lookaside buffer. In another example, the memory page size management software 715 may cooperate with the translation lookaside buffer management software 710 to execute the TLB update.

As shown in FIG. 1, the memory management software 125 may reside in a physical memory 110. The physical memory 110 may be a random access memory, a static memory, or a distributed storage medium. In the other systems, the memory management software 125 may reside on other storage media for use, storage, and or transfer of the software code. Such storage media may include, for example, a hard disk drive, a USB drive, flash memory, read only memory, optical storage media, or other storage media.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A method for managing memory of a processing system comprising:
    identifying memory page sizes supported by a processing system;
    storing the identified memory page sizes in at least one memory page size identification register;
    detecting a change in a page table including a plurality of page table entries, where each of the plurality of page table entries includes information for translating a virtual address to a corresponding physical address, memory page size for a corresponding virtual address page, and access permission information for the corresponding virtual address page;
    responding to the detection by identifying contiguous page table entries having substantially the same access permission information;
    analyzing the identified contiguous page table entries to determine whether a change of the memory page size for any of the identified contiguous page table entries is warranted, where the change of the memory page size corresponds to a supported page size as identified in the at least one memory page size identification register;
    updating the memory page size information for at least one of the identified contiguous page table entries with new memory page size information if the analysis of the identified contiguous page table entries determines that a change of the memory page size of any of the identified contiguous page table entries is warranted, where the new memory page size information corresponds to a largest memory page size to which any of the identified contiguous page table entries may be mapped and which is supported by the processing system as identified in the at least one memory page size identification register; and
    updating one or more entries of the translation lookaside buffer corresponding to at least one of the identified contiguous page table entries with the new memory page size information.

2. The method of claim 1, where storing identified memory page sizes comprises setting bits corresponding to the supported memory page sizes in the at least one memory page size identification register.

3. A processing system comprising:
    a processor;
    initialization software executable by the processor to identify one or more supported memory page sizes for storage in one or more memory page size identification registers;
    a page table including a plurality of page table entries, where each of the plurality of page table entries includes memory page size information for a corresponding virtual address page that is derived from the one or more memory page size registers;
    a translation lookaside buffer adapted to cache information about a plurality of the page table entries including corresponding memory page size information; and
    memory management software responsive to changes in the page table to consolidate contiguous page table entries into one or more page table entries having a larger memory page size identified as being supported in the one or more memory page size registers, where the memory management software further updates entries of the translation lookaside buffer corresponding to the consolidated contiguous page table entries; and
    where the memory management software limits checking for contiguous page table entries to page table entries that are locally proximate page table entries that have been changed in the page table, deleted from the page table, and/or added to the page table, where the change, deletion, and/or addition corresponds to the change in the page table to which the memory management software has responded to make the check.

4. The processing system of claim 3, where individual bits of the one or more memory page size identification registers are respectively associated with a memory page size, and where the one or more memory page size identification registers indicate that a memory page size is supported when the individual bit corresponding to the memory page size is set to a predetermined logic state.

5. The processing system of claim 3, where the initialization software is further executable to initialize memory space.

6. The processing system of claim 3, where the memory management software consolidates contiguous page table entries based on access permissions for the contiguous page table entries.

7. The processing system of claim 3, where the memory management software consolidates contiguous page table entries based on memory boundary conditions for the contiguous page table entries.

8. The processing system of claim 3, where the initialization software is executable by the processor to initialize the translation lookaside buffer.

9. Memory management system comprising:
    a processor
    initialization software executable by the processor to identify one or more supported memory page sizes for storage in one or more memory page size identification registers;
    page table management software adapted to manage a page table including a plurality of page table entries, where each of the plurality of page table entries includes memory page size information for a corresponding virtual address page that is derived from the one or more memory page size identification registers;
    translation lookaside buffer management software adapted to manage a translation lookaside buffer, where the translation lookaside buffer is adapted to cache information corresponding to a plurality of the page table entries including corresponding memory page size information; and
    memory page size management software responsive to changes in the page table to consolidate contiguous page table entries into one or more page table entries having a larger memory page size that is identified as being supported by the one or more memory page size identification registers, where the memory page size management software further updates entries of the translation lookaside buffer corresponding to the consolidated contiguous page table entries;

where the memory management software limits checking for contiguous page table entries to page table entries that are locally proximate page table entries that have been changed in the page table, deleted from the page table, and/or added to the page table, where the change, deletion, and/or addition corresponds to the change in the page table to which the memory management software has responded to make the check.

10. The memory management system of claim 9, where individual bits of the one or more memory page size identification registers are respectively associated with a memory page size, and where the one or more memory page size identification registers indicate that a memory page size is supported when the individual bit corresponding to the memory page size is set to a predetermined logic state.

11. The memory management system of claim 9, where the initialization software is further adapted to initialize the translation lookaside buffer.

12. The memory management system of claim 9, where the initialization software is further adapted to initialize system memory storage.

13. The memory management system of claim 9, where the memory page size management software consolidates contiguous page table entries based on access permissions for the contiguous page table entries.

14. The memory management system of claim 9, where the memory management software consolidates contiguous page table entries based on memory boundary conditions for the contiguous page table entries.

15. A storage medium comprising software code adapted to execute a method for managing memory of a processing system, where the method comprises:
   identifying memory page sizes supported by a processing system;
   storing the identified memory page sizes in at least one memory page size identification register;
   detecting a change in a page table including a plurality of page table entries, where each of the plurality of page table entries includes information for translating a virtual address to a corresponding physical address, memory page size for a corresponding virtual address page, and access permission information for the corresponding virtual address page;
   responding to the detection by identifying contiguous page table entries having substantially the same access permission information;
   analyzing the identified contiguous page table entries to determine whether a change of the memory page size for any of the identified contiguous page table entries is warranted, where the memory page size corresponds to a supported page size as identified in the at least one memory page size identification register;
   updating the memory page size information for at least one of the identified contiguous page table entries with new memory page size information if the analysis of the identified contiguous page table entries determines that a change of the memory page size of any of the identified contiguous page table entries is warranted, where the new memory page size information corresponds to a largest memory page size to which any of the identified contiguous page table entries may be mapped and which is supported by the processing system as identified in the at least one memory page size identification register; and
   updating one or more entries of the translation lookaside buffer corresponding to at least one of the identified contiguous page table entries with the new memory page size information.

16. The storage medium of claim 15, where storing identified memory page sizes comprises setting bits corresponding to the supported memory page sizes in the at least one memory page size identification register.

* * * * *

UNITED STATES PATENT AND TRADEMARK OFFICE
CERTIFICATE OF CORRECTION

| | | |
|---|---|---|
| PATENT NO. | : 7,779,214 B2 | Page 1 of 1 |
| APPLICATION NO. | : 11/779853 | |
| DATED | : August 17, 2010 | |
| INVENTOR(S) | : Brian Stecher | |

It is certified that error appears in the above-identified patent and that said Letters Patent is hereby corrected as shown below:

In the Claims

In column 10, claim 9, line 44, immediately after "a processor" insert --;--.

Signed and Sealed this

Ninth Day of November, 2010

David J. Kappos
*Director of the United States Patent and Trademark Office*